United States Patent [19]

Turner, Colin F. S. et al.

[11] Patent Number: 5,203,741

[45] Date of Patent: Apr. 20, 1993

[54] CONSTANT VELOCITY RATIO UNIVERSAL JOINT WITH GOTHIC ARCH SHAPED ROLLERS AND GUIDE GROOVES

[75] Inventors: Turner, Colin F. S.; Colin A. Bird, both of Sutton Coldfield, England

[73] Assignee: Hardy Spicer Limited, England

[21] Appl. No.: 689,778

[22] PCT Filed: Nov. 21, 1989

[86] PCT No.: PCT/GB89/01385

§ 371 Date: May 15, 1991

§ 102(e) Date: May 15, 1991

[87] PCT Pub. No.: WO90/06451

PCT Pub. Date: Jun. 14, 1990

[30] Foreign Application Priority Data

Nov. 26, 1988 [GB] United Kingdom ............ 8827655

[51] Int. Cl.$^5$ ............................................. F16D 3/205
[52] U.S. Cl. ................................... 464/111; 464/123; 464/132; 464/905
[58] Field of Search ............... 464/111, 120, 122–124, 464/132, 905

[56] References Cited

U.S. PATENT DOCUMENTS

| | | | |
|---|---|---|---|
| 3,613,396 | 10/1971 | Drevard et al. | 464/111 |
| 4,379,706 | 4/1983 | Otsuka et al. | 464/124 X |
| 4,384,860 | 5/1983 | Schmid | 464/905 X |
| 4,589,856 | 5/1986 | Mazziotti et al. | 464/111 |
| 4,775,355 | 10/1988 | Mizukoshi | 464/111 |

FOREIGN PATENT DOCUMENTS

| | | |
|---|---|---|
| 2369456 | 5/1978 | France . |
| 2608701 | 6/1988 | France . |
| 2622264 | 4/1989 | France . |
| 2070195 | 9/1981 | United Kingdom . |
| 2099549 | 12/1982 | United Kingdom . |
| 2176871 | 1/1987 | United Kingdom . |
| 2188701 | 10/1987 | United Kingdom . |
| 2195167 | 3/1988 | United Kingdom . |
| 2202610 | 9/1988 | United Kingdom . |
| 2204659 | 11/1988 | United Kingdom . |

*Primary Examiner*—Daniel P. Stodola
*Assistant Examiner*—William G. Battista, Jr.
*Attorney, Agent, or Firm*—Marshall, O'Toole, Gerstein, Murray & Bicknell

[57] ABSTRACT

A constant velocity ratio universal joint of the tripod type, comprising an outer joint member (10) with three guide grooves (20), and an inner joint member with arms (13) each carrying a roller (21) which is able to rotate about, move lengthwise of, and tilt relative to the arm, wherein both the external surface (22) of the roller and each side portion of a guide groove (20) engaged thereby is of a gothic arch cross sectional shape to provide for angular contact between roller and guide groove and improve the guidance of the roller so that it remains aligned in the groove for rolling therealong and with the gothic arch section of the roller and/or guide groove side comprising arcuate portions with different centers of curvature, or having part-elliptical or part-involute portions.

13 Claims, 11 Drawing Sheets

CONSTANT VELOCITY RATIO UNIVERSAL JOINT WITH GOTHIC ARCH SHAPED ROLLERS AND GUIDE GROOVES

BACKGROUND OF THE INVENTION

This invention relates to constant velocity ratio universal joints of the tripod type. A joint of the type to which the invention relates comprises an outer joint member having a rotational axis and three guide grooves extending parallel to its rotational axis and equally circumferentially spaced thereabout; an inner joint member disposed inside the outer member, having a rotational axis and three arms equally spaced about this rotational axis extending radially into the guide grooves of the outer joint member; each arm carrying a roller having an external surface which engages opposed side portions of the corresponding guide groove so that the roller is constrained to roll therealong; each roller being able to rotate about, move lengthwise of, and tilt relative to the arm by which it is carried. Such a joint will hereafter be referred to as a tripod joint of the kind specified.

In a tripod joint of the kind specified, the constraint of each roller to rolling movement along its respective guide groove in the outer joint member, without tilting relative thereto, means that the joint has a reduced frictional resistance to plunge (i.e. relative axial movement between the outer and inner joint members) and rotation when the joint is articulated. When the joint rotates in the articulated condition, each roller tilts relative to the arm by which it is carried rather than relative to the groove in which it is engaged. It will be appreciated that if the roller tilted relative to the groove, it would not be able to roll along the groove but would have to slide therealong in the tilted condition, which obviously would produce a greater frictional resistance to such movement.

There have been various proposals for arrangements by which each roller is carried by its respective arm so as to be able to undergo the necessary rotational, sliding and tilting movement relative thereto. For example, in U.S. Pat. No. 4,379,706 there is disclosed a tripod joint of the kind specified wherein each arm has an outer cylindrical surface and each roller has an inner cylindrical surface, between these two surfaces there being disposed inner and outer guide rings which have inter-engaging part-spherical surfaces. A needle roller bearing is disposed between the outer surface of the outer guide ring and the internal cylindrical surface of the roller. In this arrangement, the roller is able to tilt relative to the arm by virtue of the interengaging part-spherical surfaces of the inner and outer guide rings. The inner guide ring is able to slide lengthways on the arm. The roller is able to rotate about the arm by virtue of the needle roller bearing between the outside of the outer guide ring and the inner cylindrical surface of the roller.

A further example of a tripod joint of the kind specified is disclosed in JP-UM Laid Open No. 63-57822. In this joint, each arm of the inner joint member has a cylindrical surface and each roller comprises inner and outer roller elements with inter-engaging part-spherical surfaces. A needle roller bearing assembly is disposed between the internal surface of the inner roller element and the cylindrical surface of the arm. The outer roller element is able to tilt relative to the arm by virtue of the interengaging part-spherical surfaces of the inner and outer roller elements, while both the inner and outer roller elements together are able to rotate about the arm and slide lengthways of the arm, such rotational and sliding movement together taking place at the needle roller bearing between the internal surface of the inner roller element and the outer cylindrical surface of the arm.

In JP-UM 63-57822, the outer peripheral surface of the outer roller element is toroidal, i.e. it is a surface of rotation, about the axis of the roller, of an arc which, in a section through the roller element viewed lengthwise of the guide groove in the outer joint member, has a radius of curvature smaller than the outer diameter of the outer roller element. Each side portion of the guide groove, where it is engaged by the outer roller element is of "gothic arch" section, comprising two arcuate portions with different centres of curvature so that the outer peripheral surface of the outer roller element contacts the groove side portion at two points (although it will be appreciated that when under load the roller/groove engagement is through small elliptical areas of contact rather than at true points). This condition, referred to as angular contact, provides for a reduction of friction between the outer roller element and groove when rolling therealong, and also such a configuration resists tilting of the outer roller element within the groove.

In practice the effectiveness of the angular contact between roller and groove in preventing the roller from tilting is subject to tolerances which inevitably are present when these components are mass produced. If the roller element fitted in the groove with no backlash (clearance) whatsoever, then it would be impossible for the roller element to tilt within the groove. If, however, as will in practice be the case, the roller element is not a perfect fit in the groove and there is some clearance or backlash therebetween, the roller element will be able to tilt within the groove to a small extent. This is particularly a problem when the joint is transmitting little or no torque, when the roller element is free to tilt until the clearance between it and the groove is taken up. When the joint is transmitting torque, the fact that the roller element is urged into engagement with a side portion of the groove has the effect that the roller element is brought into alignment with the groove. The geometry of the surfaces of the roller element and groove side portion, engaging with angular contact, is such that any tendency of the roller element to tilt produces a couple which acts on the roller element to tend to restore it to its aligned orientation.

Since the smoothness of operation of a joint of the kind specified, however, is dependent on the maintenance of the roller elements in or as close as possible to the correct alignment in the grooves under all conditions of joint operation, it is recognised that if the control of the alignment of the roller elements can be improved then joint performance can be enhanced. It is, accordingly, the object of the present invention to provide a tripod joint of the kind specified wherein such improved control of the alignment of the roller elements can be achieved.

SUMMARY OF THE INVENTION

According to the present invention, we provide a tripod joint of the kind specified wherein both the external surface of each roller and each guide groove side portion engaged thereby have cross sectional shapes including portions which are of gothic arch configuration to provide for angular contact therebetween.

Thus, in a joint according to the invention, angular contact between the roller external surface and each groove side portion is provided, but instead of the cross-section of the roller surface being arcuate it comprises portions which independently have angular contact with the groove side portions.

The advantage of this is that better control of roller/-groove alignment can be maintained. With such a mode of engagement between the roller and guide groove side portion, any tendency of the roller to tilt results in the establishment of a restoring couple which is greater than the restoring couple established in the case of a roller otherwise dimensionally comparable and arranged for angular contact at the same pressure angle, but with a groove-engaging external surface which in section is a single arc. This will be described in greater detail hereafter with reference to the accompanying drawings.

The gothic arch cross-sectional shape of the external surface of each roller may comprise portions which are arcuate with different centres of curvature. Similarly the gothic arch cross-sectional shape of each guide groove side portion may comprise arcuate portions with different centres of curvature. The gothic arch shape of the roller external surface may be truncated to give an increased clearance between roller and guide groove at the apices of their gothic arch shapes.

Other gothic arch cross-sectional shapes of the engaging surfaces of each roller and guide groove can be utilised, as alternatives to the gothic arch shape comprising arcuate portions. In particular, the surfaces of each roller and/or groove side portion may comprise portions of part-elliptical or part-involute cross-sectional shape.

When the outer member of a joint of the kind specified is being manufactured, which will be done by a forming or extrusion process rather than by machining in view of the difficulty of machining the required shape of the guide groove side portions, some distortion of the joint outer member inevitably results from such manufacture and subsequent heat treatment thereof. Manufacturing tolerances of the outer joint member and the rollers have to be selected to take account of such distortion. However, such distortion usually takes place in a way which can be predicted and which leads to a relatively predictable lack of symmetry of the guide groove side portions. In a joint according to the invention, the fact that the external roller surface is not a single arc in cross-section but is a gothic arch shape including, for example, arcuate parts with different centres, gives the possibility for the cross-sectional shape of the roller external surface itself to be made asymmetrical to match the asymmetric distorted shape of the guide groove side portions.

Preferably the joint is one wherein each roller is carried on its arm by an inner roller element having a substantially part-spherical external surface, engaging a complementary substantially part-spherical internal surface in the interior of the roller, the inner roller element further comprising a cylindrical internal surface whereby it is able to rotate about and move lengthwise of the arm on which it is carried, preferably with the interposition of a needle roller bearing assembly.

In a joint according to the invention, the nature of the engagement between rollers and their guide groove side portions is of improved effectiveness, when the joint is transmitting torque, to resist any tendency of the rollers to tilt within the grooves. However, as above referred to, production tolerances necessarily mean that there will be some clearance between each roller and its guide groove in the direction diametrically of the roller, so that when the joint is not transmitting torque the roller will tend to move away from the guide groove side portion it was previously engaging. The roller will then be able to tilt to some extent before the clearances are taken up and it can tilt no further. Therefore, in certain circumstances, it may be desirable to provide further means for preventing the rollers from tilting more than by a minimal amount. Several examples of such means are described in detail hereafter.

If such additional means is not provided, the rollers are able to tilt within the guide grooves to the extent permitted by the clearances therein. Such tilting of the rollers can give a joint according to the invention the ability to articulate to an increased angle, provided that such articulation is not a condition which is present for a significant length of time. In a motor vehicle, maximum joint articulation is caused by maximum jounce and/or rebound of the vehicle suspension, and when the vehicle is in use these are conditions which are never more than transient. Therefore, it is acceptable if maximum joint articulation requires the joint rollers to tilt slightly in their grooves.

In joints of the kind specified, maximum articulation angle is usually limited by metal to metal contact of the rollers with the inner joint member. The ability of the rollers to tilt slightly in their grooves gives a joint articulation capability slightly greater than would be limited by such contact.

BRIEF DESCRIPTION OF THE DRAWINGS

The invention will now be described by way of example with reference to the accompanying drawings, of which.

DETAILED DESCRIPTION OF THE INVENTION

Figure 1:
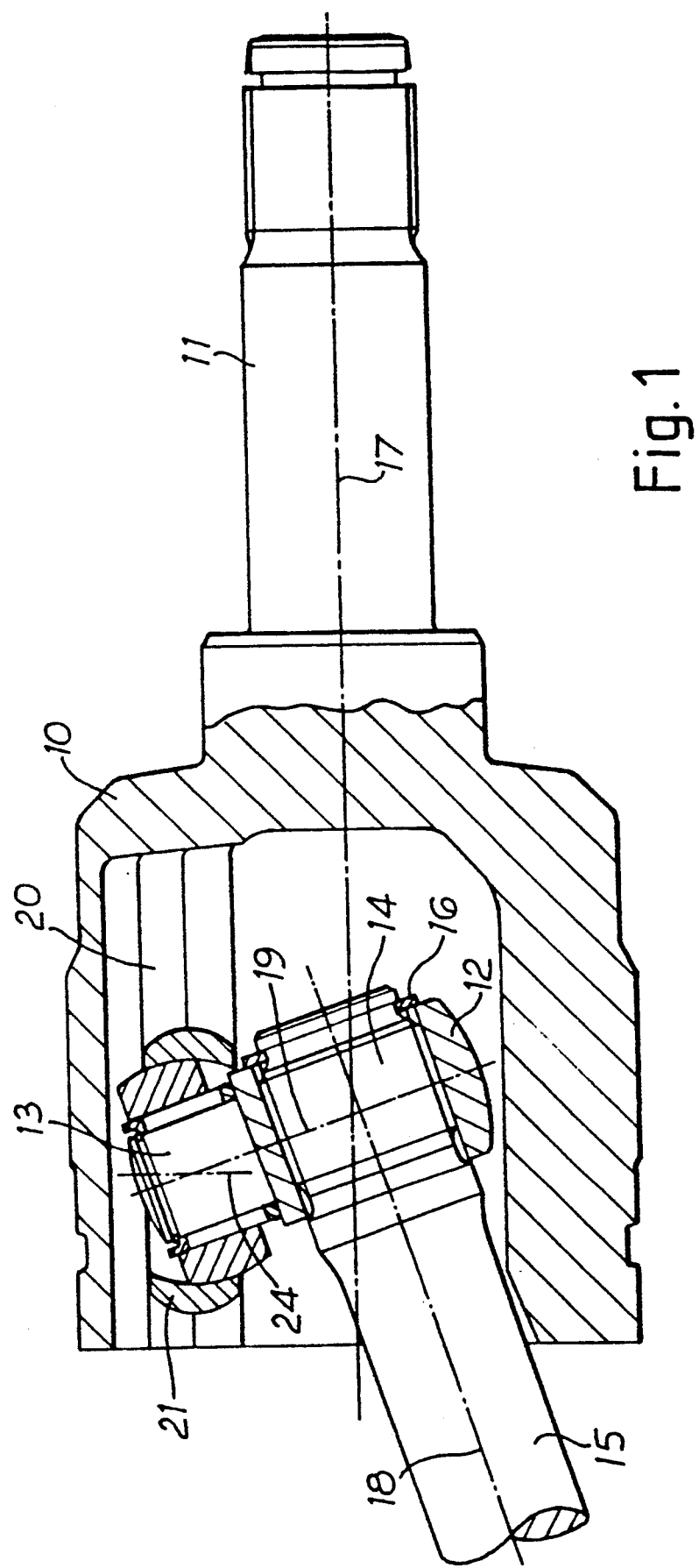
FIG. 1 is a partly sectioned elevation of a joint according to the invention, in the articulated condition.

Referring firstly to FIG. 1 of the drawings, there is shown a universal joint of the tripod type, comprising an outer joint member 10 in the form of an elongate cup-shaped component, from whose closed end a stub shaft 11 extends. Disposed within the outer joint member is an inner joint member 12, of annular form having three circumferentially equally spaced arms 13 extending radially outwardly therefrom. The interior of the inner joint member 12 is splined to have torque transmitting engagement with a splined end portion 14 of a shaft 15, being retained thereon by a circlip 16. In FIG. 1, the rotational axis of the outer joint member is indicated at 17, and that of the inner joint member at 18, the joint being depicted in the articulated condition wherein the axes 17, 18 are inclined to one another. Also shown in FIG. 1 is the axis 19 of one of the arms 13 which is visible in the section shown, the axis 19 being perpendicular to the axis 18.

The interior of the outer joint member is formed with three equally circumferentially spaced guide grooves 20, extending parallel to the axis 17 of the joint member. The guide grooves 20 are engaged by respective rollers 21 carried by the arms 13 of the inner joint member, the arrangement of guide groove, roller and associated parts being seen more clearly in FIG. 2.

Figure 2:
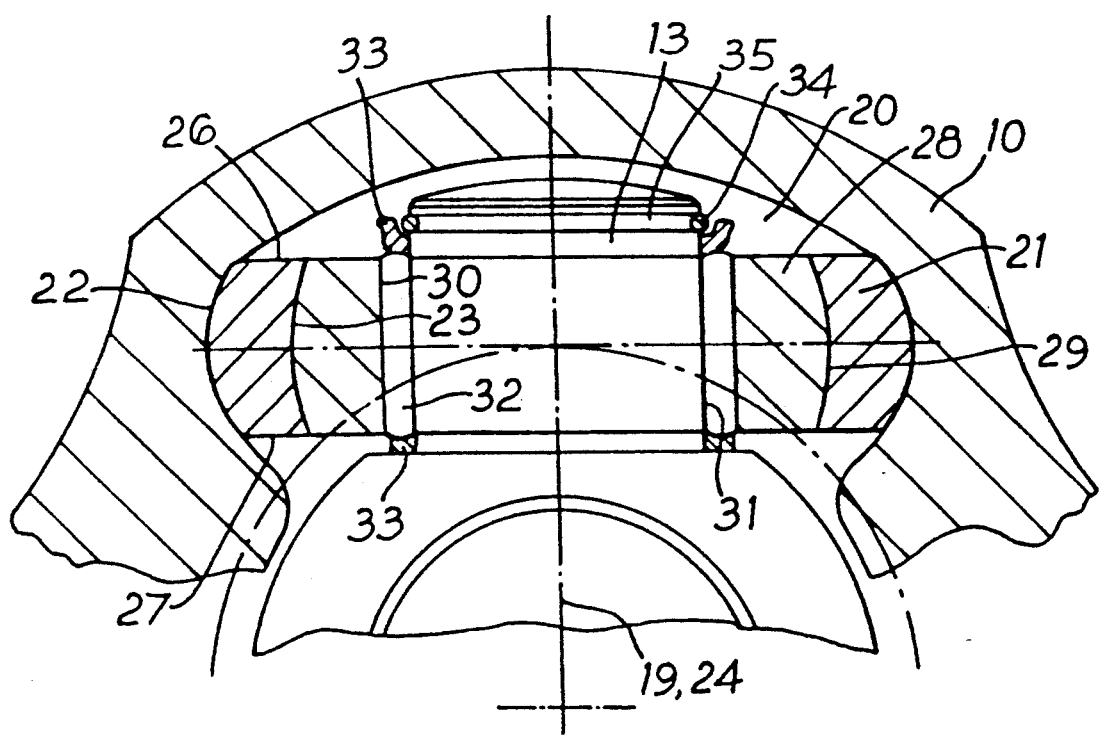
FIG. 2 is a partly sectioned end view of part of the joint of FIG. 1, shown in the non-articulated condition.

Referring now to FIG. 2, there is shown one of the guide grooves 20 in the outer joint member 10. The groove 20 has two opposed side portions which are mirror images of one another, to be engaged by diametrically opposed parts of the roller 21. The roller 21 is of annular form, having an external surface 22 and an internal surface 23. The external surface 22 of the roller is a surface of revolution described by rotating, about a central axis 24 of the roller, a line in the shape of a truncated gothic arch as shown in greater detail in FIG. 3. FIG. 2 shows the joint in the aligned condition, wherein the axis 24 of the roller 21 is coincident with the axis 19 of the arm 13. The internal surface 23 of the roller is substantially part-spherical. The roller further comprises end faces 26, 27 which are planar and perpendicular to the axis 24, the edges of the roller being radiused where the end faces thereof meet the external surface 22 of the roller.

The roller is carried on the arm 13 by an inner roller element 28. This has a substantially part-spherical external surface 29 which engages the internal surface 23 of the roller 21, so that the roller is able to tilt relative to the inner roller element 28. The element 28 further comprises an internal surface 30 which is cylindrical, and is supported on a cylindrical surface 31 of the arm 13 with the intermediary of a needle roller bearing assembly comprising a plurality of needle rollers 32 disposed circumferentially about the arm 13 and extending parallel to the axis 19 thereof. The needle rollers 32 are retained in position between the arm 13 and the inner roller element 28 by cage rings 33 and a retaining spring ring 34 engaging a groove 35 adjacent the end of arm 13.

The roller 21 is thus able to undergo, simultaneously, three different movements relative to the arm 13. It is able to rotate about the axis 19 of the arm, when the roller 21 together with the inner roller element 28 rotate about the axis 19 with minimal frictional resistance as a result of the presence of the needle rollers 32 interposed between the arm and the inner roller element. The roller 21 is able to move lengthwise of the arm 13, this movement occurring at the interface between the internal surface 30 of the element 28 and the needle rollers 32. The roller is able to tilt relative to the arm 13, the tilting movement occurring at the interengaging substantially part-spherical surfaces 23, 29 of the roller and the inner roller element. When the joint is rotating in the articulated condition, all three movements are involved; FIG. 1 shows the joint in such condition wherein the above described tilting of the roller relative to the inner roller element has occurred, and the inner roller element has moved radially outwardly relative to the arm 13 and needle rollers 32.

Figure 3:
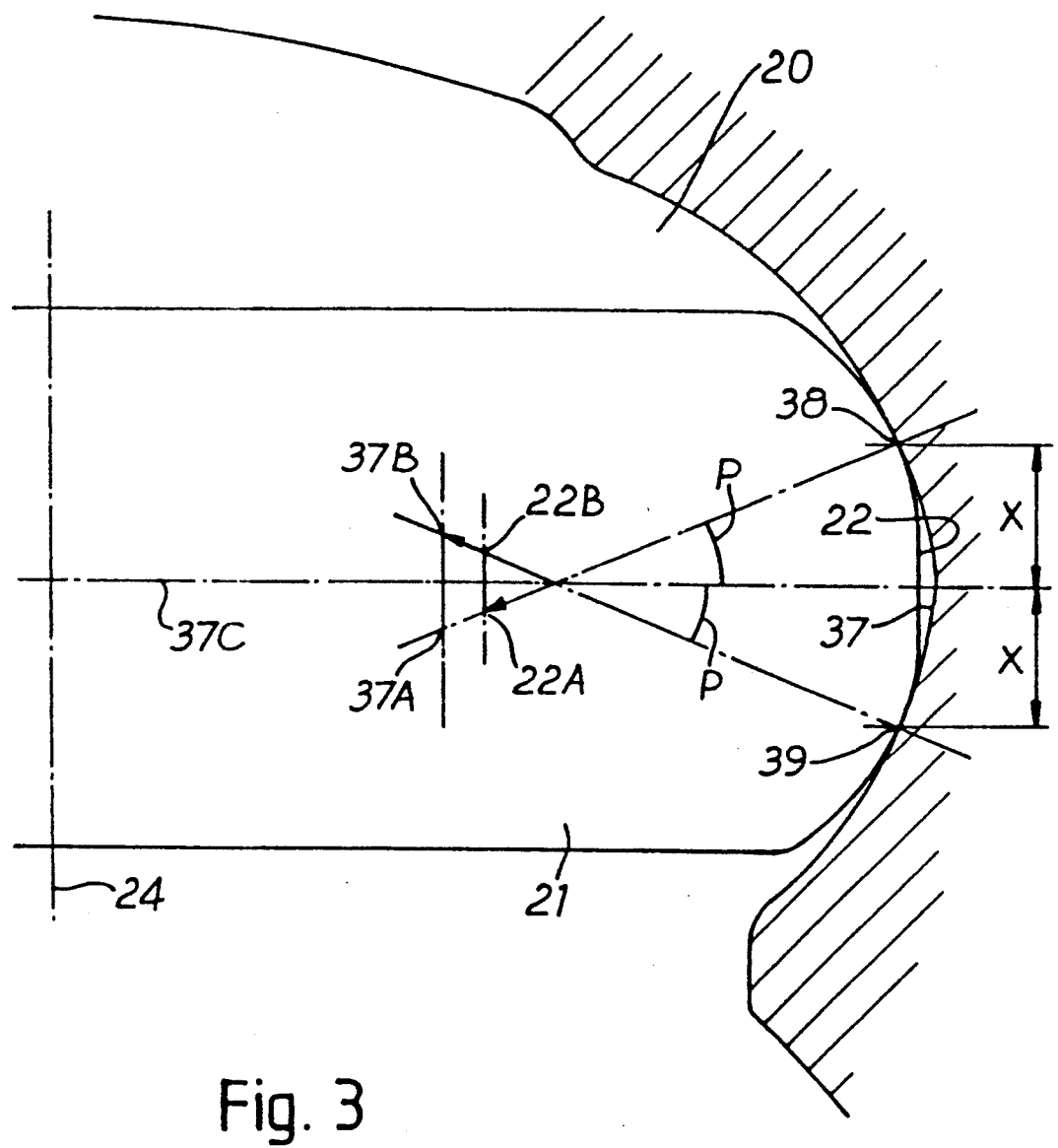
FIG. 3 is an enlargement of part of FIG. 2.

Referring now to FIG. 3 of the drawings, this is a section, perpendicular to the axis of rotation 17 of the outer joint member 10 and containing the axis 24 of the roller, which shows in detail the configuration of the external surface 22 of the roller and the side portion it engages of the guide groove 20. The external surface of the roller is a truncated gothic arch shape in this section, comprising arcuate portions having respective centres of curvature 22A, 22B offset to opposite sides of the transverse centre plane, indicated at 37C, of the roller. The side portion of the guide groove 20 where it is engaged by the roller is a gothic arch shape in section, comprising arcuate portions with respective centres of curvature 37A and 37B also offset on opposite sides of the plane 37C. The radii of curvature of the arcuate parts of the guide groove side portion 37 are slightly greater than the radii of curvature of the arcuate parts of the roller external surface, with the result that contact therebetween is established at two spaced "points" 38, 39 (in practice small elliptical areas when the joint is transmitting torque and deformation occurs as the roller is pressed against the groove side portion).

The above described engagement between the roller and guide groove side portion at two spaced points is the condition generally known as "angular contact". The angles indicated at P between the perpendiculars at the contact points and the roller centre plane 37C are known as the pressure angles. The condition of angular contact between the roller and guide groove has the effect, when torque is being transmitted, that the roller is guided so that it stays in alignment relative to the guide groove, with its axis 24 perpendicular to the rotational axis of the outer joint member. Any tendency for the roller to tilt in the guide groove so that its axis inclines to the axis of the outer joint member, in the same sense that axis 19 is inclined to the axis 17 in FIG. 1, results in the establishment of a couple which tends to restore the roller to the correct alignment.

With the illustrated groove and roller configuration, the restoring couple established if there is any tendency of the roller to tilt is greater than if the cross-sectional shape of the external surface of the roller were a single arc of a radius chosen to provide angular contact with the track groove side portion at the same pressure angle. This is a result of the reduction of the rate at which the surfaces of the roller and groove side portion diverge from one another with increasing distance from the contact points therebetween, as they are viewed in cross-section.

When the roller attempts to tilt in the track, an increase in pressure angle occurs with a consequent increase in the offset of the contact "points" 38, 39 from the roller central plane 37C. With the gothic arch sections of roller and groove, the rate of change of the offset distance X relative to the rate of change of pressure angle P is greater than can be achieved with a roller whose external surface is in the section of a single arc.

In design of a roller and guide groove for angular contact, one wants to achieve a predetermined pressure angle and, in order to provide sufficient load carrying capacity, conformity ratio between the local radii of curvature of the guide groove side portions and contacting parts of the roller external surface. Within such constraints, the gothic arch sections of the roller surface and guide groove can provide the improved resistance to tilting of the roller. It can be shown that when the guide groove side portion is of gothic arch cross section and the external surface of the roller is arcuate in section, it is not possible to achieve the required conformity of curvature between the roller and groove side portion surfaces to give the necessary load carrying capacity, unless the pressure angle is changed adversely.

As shown in FIG. 3, both the external surface of the roller and the shape of the side portion of the guide groove are symmetrical about the plane 37C. The centres of curvature 22A, 22B are equally offset from the plane 37C. However, one problem in the production of the outer joint members of tripod joints and the provision of the guide grooves therein by a forming process is that of distortion, arising from the manufacturing process and from heat treatment. The result of such distortion is that the gothic arch cross-sectional shape of the side portion of the guide groove may be misaligned or non-symmetrical about the plane 37C, so that it is not engaged by the roller with equal pressure angles. This could then lead to scuffing of the roller as it rolls along the guide groove.

Figure 4B:
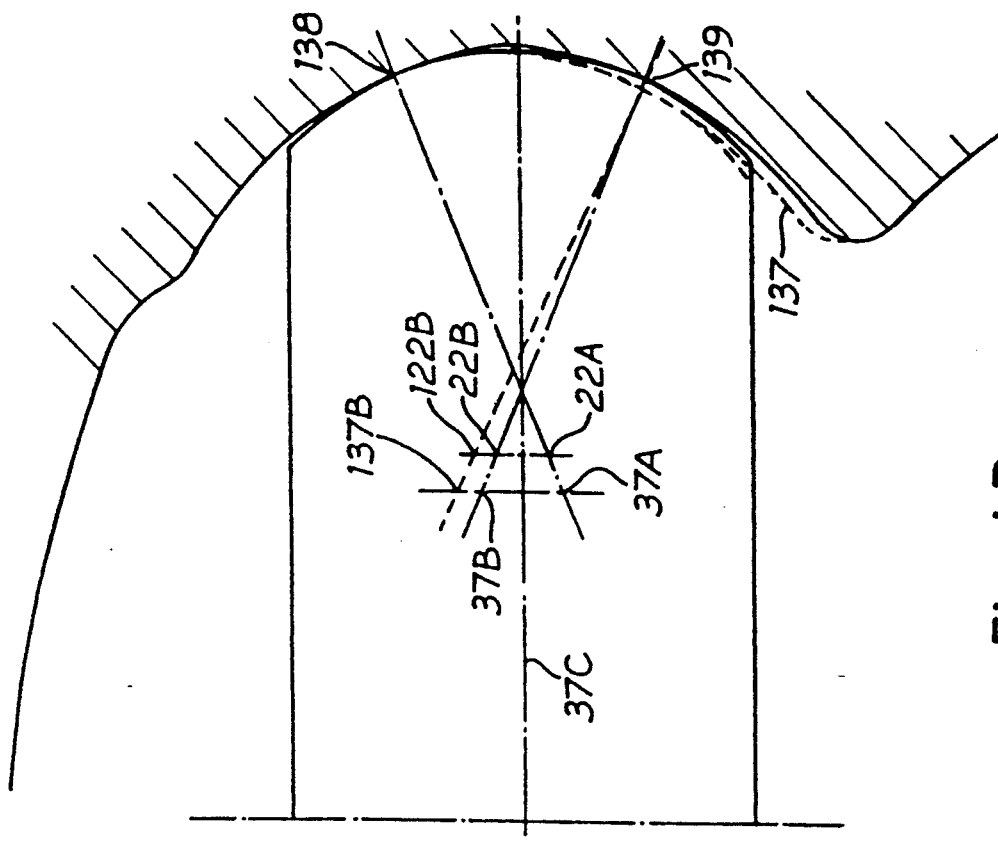
FIGS. 4A and 4B show diagrammatically further possible roller and guide groove configurations in a joint according to the invention.
Figure 4A:
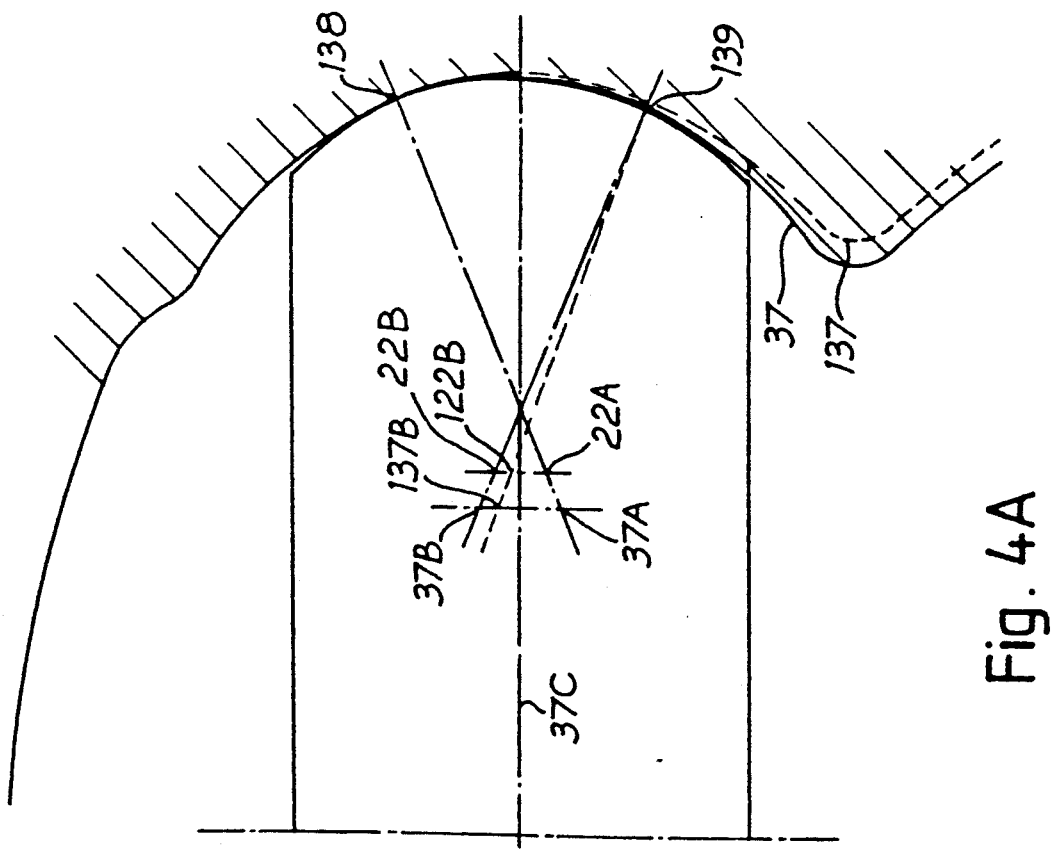

If, however, the nature of such distortion can be predicted, it is possible to make the roller itself asymmetrical so that it engages the groove side portion correctly. FIGS. 4A and 4B show possible such distorted guide groove configurations, and asymmetric roller configurations to engage correctly therewith.

FIG. 4A shows, in a broken line indicated at 137, one possible deviation of the guide groove side portion from the symmetrical configuration thereof indicated at 37. The centre of curvature of the corresponding arcuate part of the gothic arch section of the guide groove side portion is indicated at 137B, offset from the plane 37C by a lesser distance than the centre of curvature 37A of the undistorted surface part. To compensate for such distortion, the centre of curvature 122B of the corresponding arcuate part of the gothic arch section of the external surface of the roller is offset from the plane 37C by a lesser distance than is the centre of curvature 22A of the other arcuate part of the roller surface.

FIG. 4B shows an alternative condition wherein distortion of the joint outer member has produced a surface 137 whose centre of curvature, at 137B, is offset from the plane 37C by a greater distance than is the centre of curvature 37A of the other part of the gothic arch section of the groove side portion. To compensate for this, the centre of curvature 122B of the corresponding arcuate part of the gothic arch section of the roller is offset from the plane 37C by a greater distance than is the centre of curvature 22A of the other arcuate section of the roller's external surface.

Although it is convenient for the gothic arch cross sectional shape of the guide groove side portion and of the roller external surface to comprise respective arcuate portions whose radii and centres of curvature can be selected as above described with the possibility of compensating for joint outer member distortion, the same benefits in terms of improved control of roller alignment can be obtained with other gothic arch surface shapes. In particular, the surfaces of the roller and/or guide groove side portion where they engage could be of part-elliptical or part-involute section. This could lead to a further reduction of the rate at which the surfaces of the roller and groove side portion diverge from one another with increasing distance from the contact points therebetween, as they are viewed in cross-section.

Figure 5:
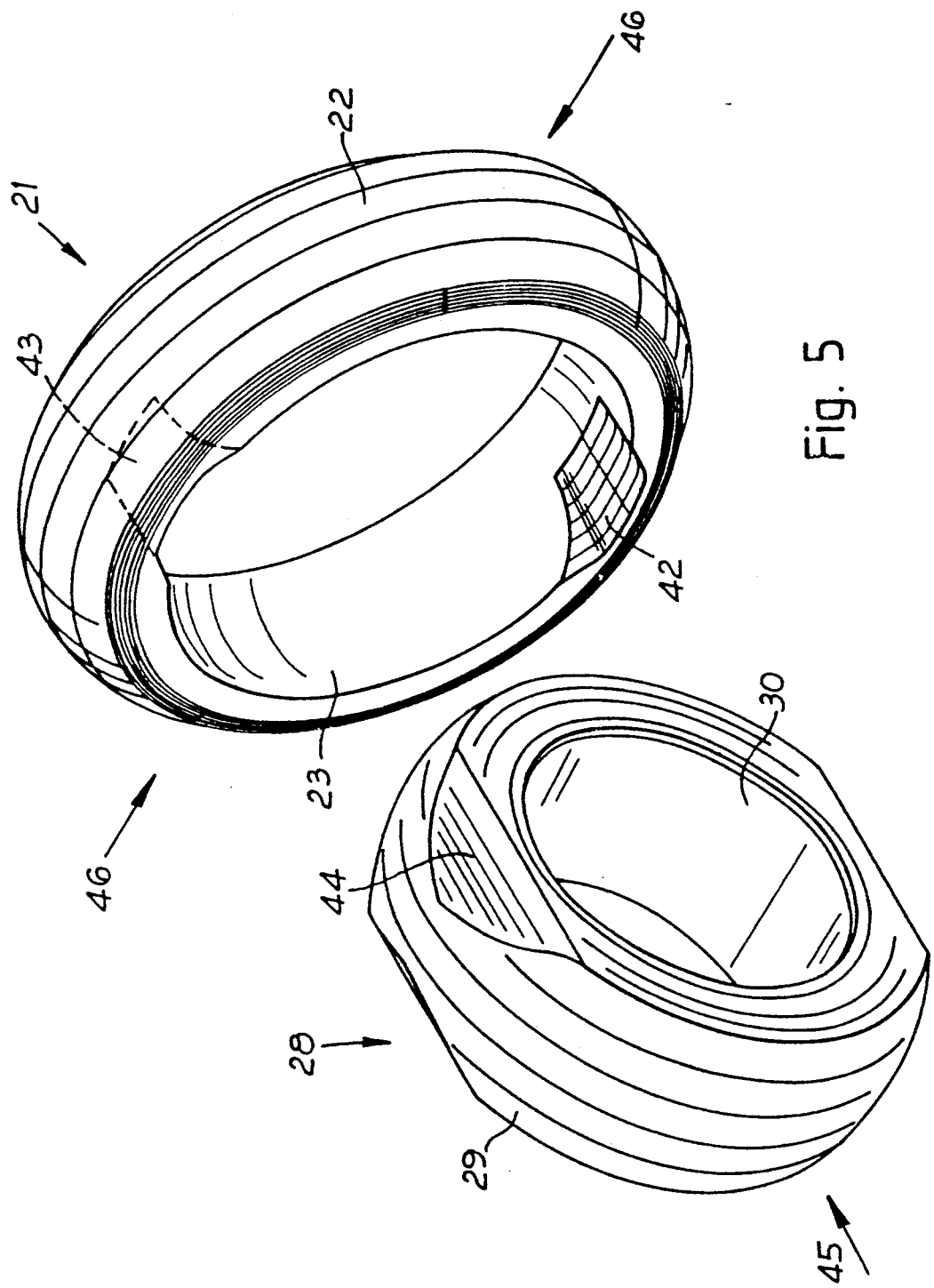
FIG. 5 is a perspective view showing parts of the joint in a condition prior to assembly.

Referring now to FIG. 5 of this drawings, this shows, in a diagrammatic perspective view, one way in which the roller 21 and the inner roller element 28 may be assembled with one another. To enable the internal substantially part-spherical surface 23 of the roller to be engaged with the external substantially part-spherical surface 29 of the inner roller element, the roller 21 may have its internal surface relieved in two diametrically opposed regions 42, 43, extending from one of the end faces 26 or 27 of the roller halfway to the other end face. The inner roller element 28 is relieved by the provision at each side of two opposed chamfers, one of which is clearly visible at 44. These enable the inner roller element 28 to be inserted into the roller 21 in the direction indicated by arrow 45, when these components are placed in the relative orientation shown with their axes at right angles to one another. Thereafter the inner roller element can be moved angularly within the roller to the relative orientation which it occupies in the assembled joint, and will remain held thereto under all conditions of relative tilting likely to be encountered in use.

An alternative method of assembly is possible if the roller 21 has a wall sufficiently thin to enable it, without having to be subjected to excessive force, to deform elastically to enable it to be "sprung" onto the inner roller element without requiring the presence of at least one of the expedients such as the relieved regions 42, 43 and chamfers 44. If a force is applied to the roller in the diametrically opposed directions indicated by arrows 46, the dimension of the roller in the direction perpendicuar thereto will be increased slightly, to facilitate the inner roller elements being inserted therein by application of sufficient force in the direction of arrow 45. When the substantially part-spherical external surface of the inner roller element is positioned within the internal substantially part-spherical surface of the roller, release of the force applied to the roller permits it to resume its circular shape and the inner roller element is then captive therein.

A further significant aspect of the engagement of the substantially part-spherical surfaces of the roller and inner roller element with one another is that reduced friction therebetween may be obtainable if they deviate slightly from truly part-spherical shape. In particular, as the surfaces are viewed in section as shown in FIG. 1 and FIG. 2 of the drawings, it is preferable if the external surface 29 of the inner roller element is convexly curved with a radius of curvature slightly less than the radius of curvature of the concave internal surface 23 of the roller. The surfaces then tend to engage over an annular contact area of width less than the thickness of the roller. This leads to reduced frictional resistance to tilting of the roller relative to the inner roller element as compared with the resistance which would be present if the curvatures of the engaging surfaces were different in the opposite sense (i.e. than if the internal surface 23 of the roller had, in the section shown, a radius of curvature slightly less than the radius of curvature of the external surface 29 of the inner roller element. In this case, the surfaces would contact over two spaced annular regions). It will be appreciated that to achieve the required engagement, one or both of the interengaging surfaces will deviate slightly from being truly part-spherical, being a surface of revolution of an arc of the appropriate radius about the axis of the roller or inner roller element.

It is possible for one of the engaging part-spherical surface of the roller or inner roller element to be treated with a material having a low coefficient of friction, e.g. a bonded lubricant or a metal or plastics coating. Such surface treatment reduces the resistance to free rotation of the roller resulting from its engagement with the inner roller element. A lower coefficient of friction may exist between the roller and inner roller element than that which exists between the roller and the guide groove which would not be so treated and which could have a rougher surface texture.

As above described, the nature of the engagement between the roller and each guide groove side portion is effective, when the joint is transmitting torque, to resist any tendency of the roller to tilt within the guide groove. However, production tolerances necessarily mean that there will be some clearance between roller and guide groove in the direction diametrically of the roller, and when the joint is not transmitting torque the roller will tend to move away from the guide groove side portion it was previously engaging. Even with the gothic arch/gothic arch configuration of the surfaces of the roller and guide groove side portion according to the invention, the roller will then be able to tilt to some extent before clearances are absorbed and no further tilting is possible. In a motor vehicle, unless such tilting is prevented, the result may be transmission and generation of noise and vibration under operational conditions involving the transmission of low or zero torque, and frequent torque reversals. Therefore it may in certain circumstances be desirable to provide the joint with means for positively preventing the rollers from tilting (although in other circumstances the improved resistance to roller tilting in a joint according to the invention may be adequate without requiring such additional provision).

Some embodiments of such additional means for preventing the rollers from tilting in the guide grooves in the outer joint member are shown in the following figures of drawings.

Figure 6:
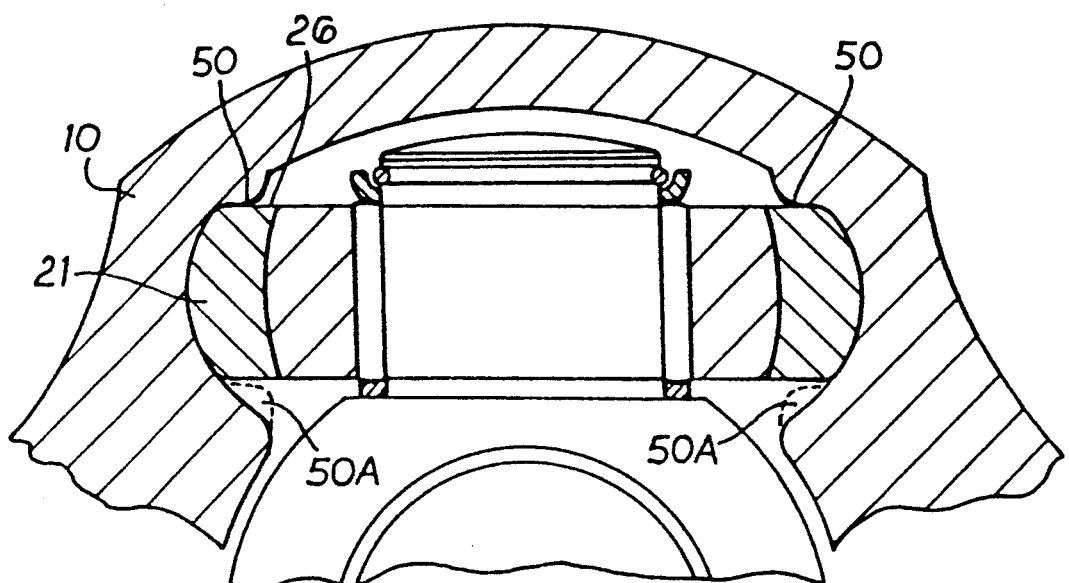
FIGS. 6 and 7 are views as FIG. 2 showing further embodiments of joint according to the invention.

FIG. 6 shows, in a view corresponding to that of FIGS. 2, an outer joint member 10 whose guide groove is provided, adjacent its side portions engaged by the external surface of the roller, with guide shoulders 50. The shoulders are engagable with the end face 26 of the roller 21 and would be arranged such that when the roller is exactly aligned in the guide groove, with its axis perpendicular to the axis of rotation of the outer joint member, there is a very slight clearance between the shoulders and end face of the roller. As soon as the roller begins to tilt, it contacts the shoulder and substantial tilting is prevented. Alternatively or in addition, shoulders engagable with the opposite end face of the roller may be provided, as shown in outline at 50A.

Figure 7:
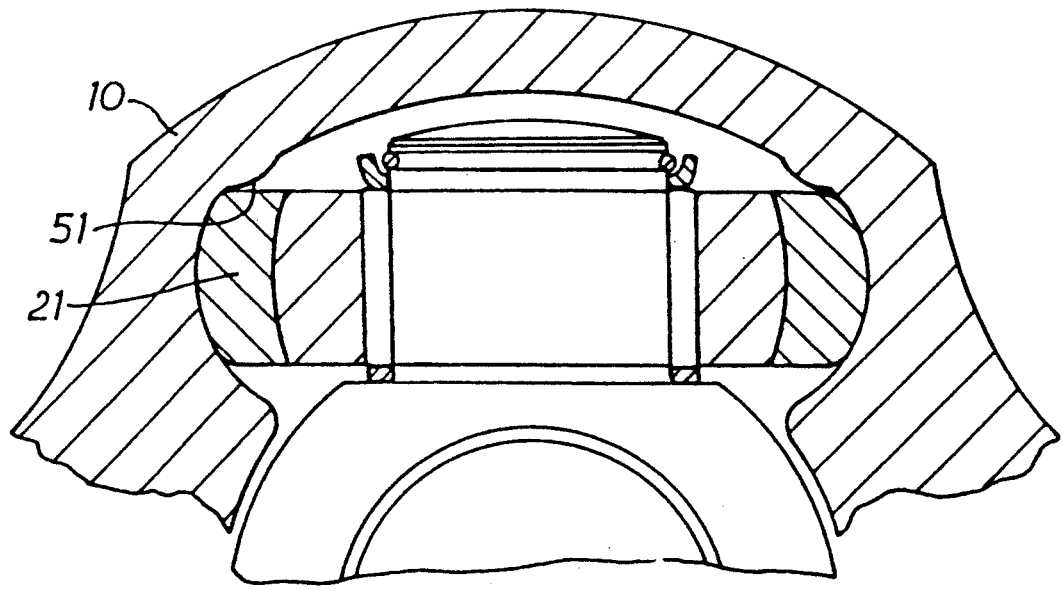

FIG. 7 shows an embodiment of joint which is generally the same as that of FIG. 6, except that the guide shoulders provided by the outer joint member adjacent the side portions of the guide groove engaged by the external surface of the roller have slightly inclined flat or curved surfaces 51, engagable with the end face of the roller where the latter meets the external surface of the roller.

Figure 8:
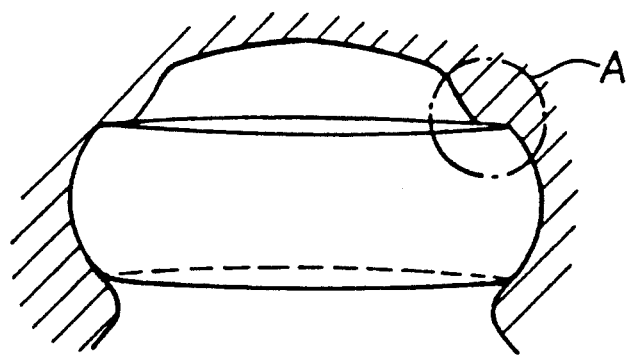
FIG. 8 is an enlarged view of part of FIG. 7, showing the roller in a slightly tilted condition.
Figure 8A:
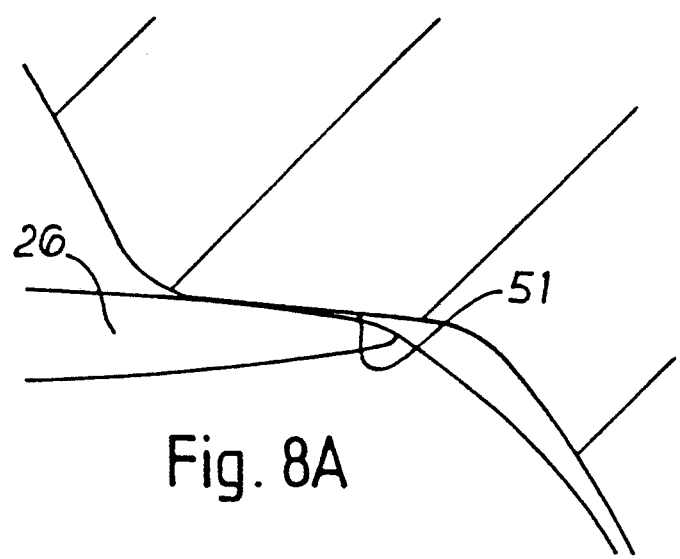
FIG. 8A is a further partial enlargement of FIG. 8.

FIG. 8, and its inset FIG. 8A which is a yet further enlargement of the part A of FIG. 8, show what happens in the embodiment of FIG. 7 when the roller begins to tilt in its guide groove. The shoulder 51 is so configured that the roller contacts it over an elongated line rather than at a point. This has the effect of spreading the impact force between the roller and shoulder, reducing wear and causing less noise to be generated.

Figure 9:
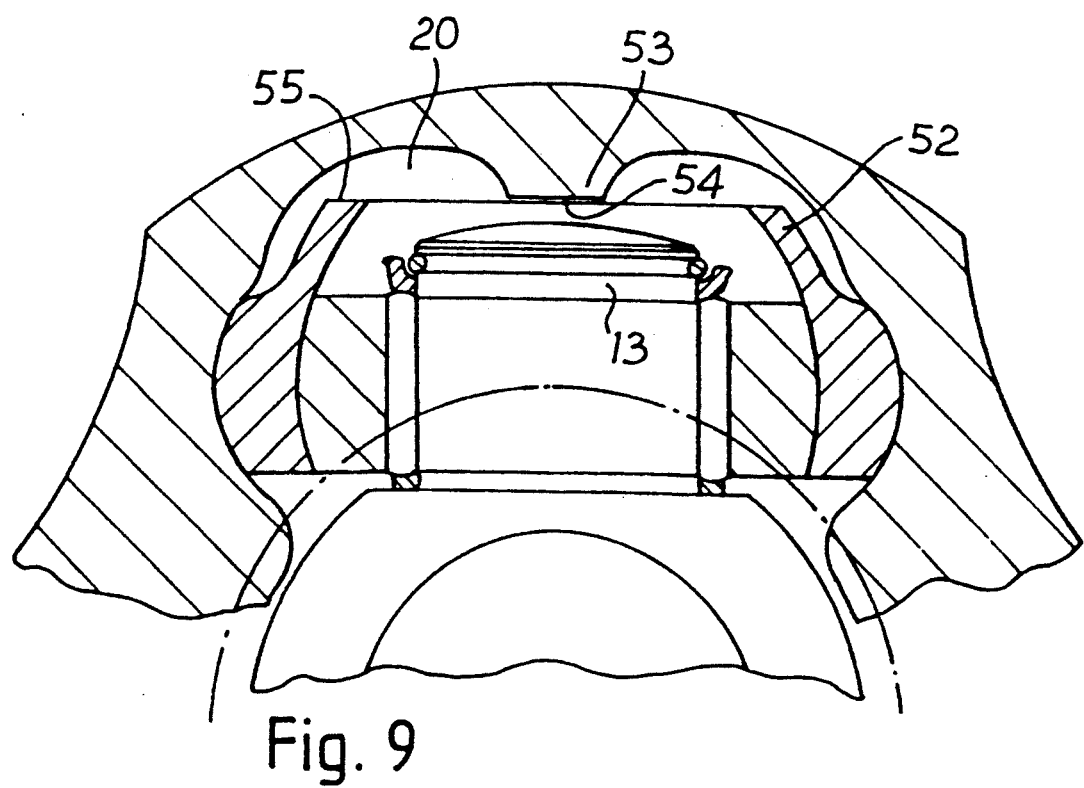
FIG. 9 is a view as FIG. 2 of yet a further embodiment of joint according to the invention.

FIG. 9 shows an embodiment with yet a further means for constraining the roller against tilting relative to the outer joint member. In this embodiment, the guide groove has no shoulders to constrain the roller but the roller has an annular extension part 52 which extends radially outwardly of the joint as a whole, beyond the end of the arm 13. The guide groove 20 in the outer joint member is provided in its base portion with a rib 53 extending radially inwardly of the outer joint member. The rib 53 affords a flat abutment surface 54, facing the end of arm 13.

The extension 52 of the roller has a planar annular end face 55 which, when the joint is transmitting torque and the angular contact engagement between the roller and opposed side portions of the guide groove is such as to cause the roller axis to remain perpendicular to the rotational axis of the outer joint member, is slightly spaced from the surface 54. When the joint is not transmitting torque and the roller is not thus constrained, the surface 54 can come into contact with one or other diametrically opposed part of the end face 55, to prevent the roller from tilting more than by a minimal amount.

Figure 10:
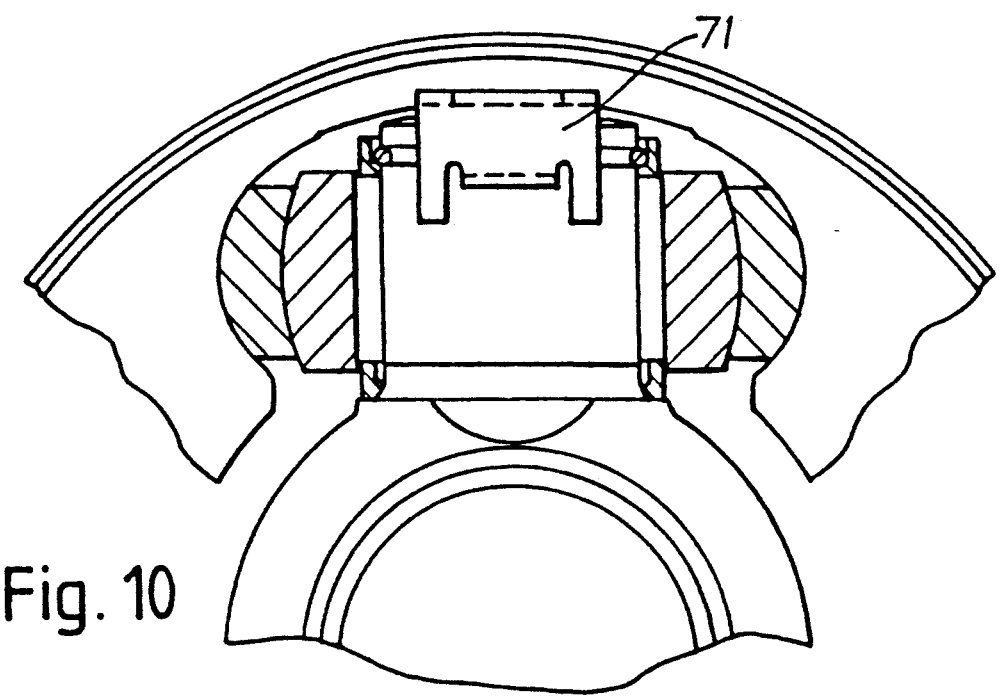
FIG. 10 is a view as FIG. 2 of another embodiment of joint according to the invention.
Figure 11:
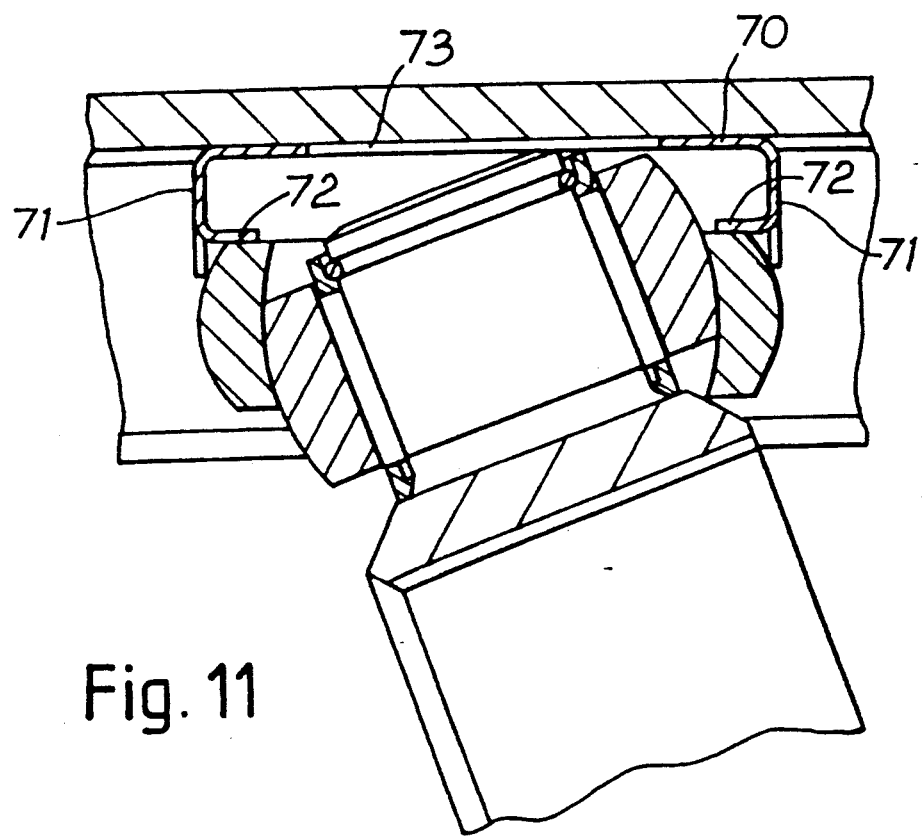
FIG. 11 is a longitudinal section of the joint shown partly in transverse section in FIG. 10.

FIGS. 10 and 11 of the drawings show an embodiment of joint wherein tilting of the roller is prevented by a guide element 70 of sheet metal, e.g. spring steel, which engages the roller and a base portion of the guide groove in the outer joint member. The guide element 70 has a flat base, which engages the guide groove in the outer joint member, and limbs 71 extending radially inwardly (of the outer joint member as a whole) therefrom. The base of the guide element is relieved in its centre at 73, to give clearance for the end of the arm 13 without requiring an increase in the diameter of the outer joint member. Each limb 71 extends to meet the outer surface of the roller, and has an inwardly bent tag 72 which engages the radially outermost end face of the roller.

As it engages the roller at diametrically opposed parts thereof, and as the flat base of the guide element is relatively long, the guide element 70 can exert a sufficient couple on the roller to prevent the latter from tilting in the guide groove without involving large contact pressures where it engages the roller and outer joint member. Thus, although the guide element has to slide axially of the outer joint member, unacceptable wear does not occur and an undue resistance to rolling movement of the roller along the guide groove does not result.

As an alternative to being made of sheet metal, the guide element 70 could be moulded of a plastics material.

Figure 12:
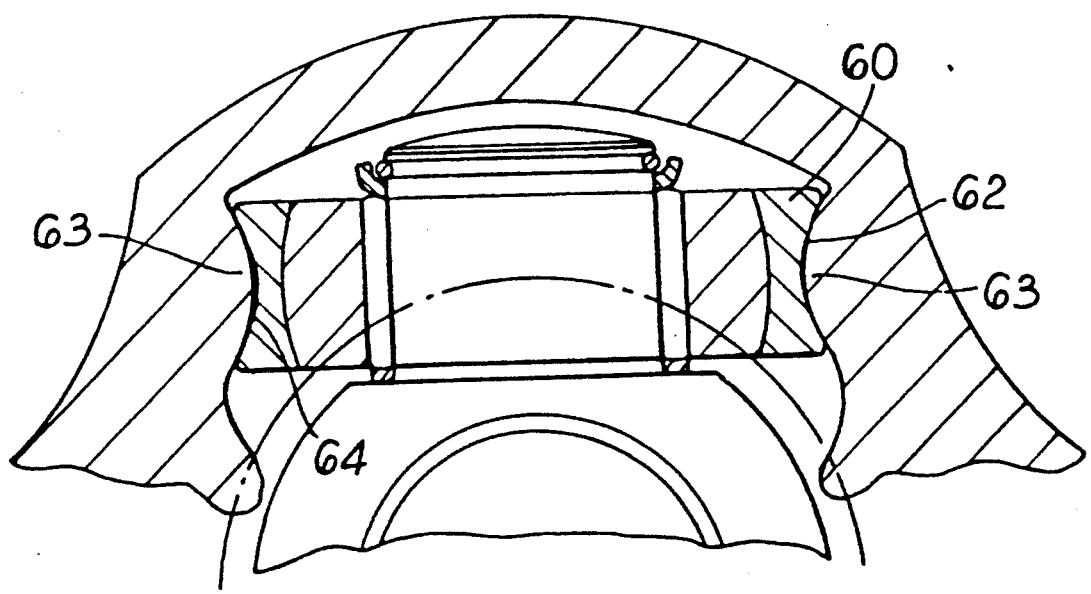
FIG. 12 is yet a further view as FIG. 2 showing a final embodiment of joint according to the invention.

Referring now to FIG. 12 of the drawings, this shows an embodiment of joint according to the invention wherein, instead of the external surface of the roller being convex and the side portions of the guide groove it engages being concave in cross-section, the external surface of the roller is concave and the side portions of the guide groove are convex. The inner joint member, arms thereof, and inner roller elements supported on the arms by needle roller bearings, are all identical to the corresponding components of the joints above described and therefore will not be again described in detail. The illustrated roller, indicated at 60, has a substantially part-spherical internal surface 61 as above described, whilst the external surface 62 of the roller is of concave gothic arch section so that the roller as a whole is somewhat of diabolo shape. Opposite side portions of the guide groove are provided with convex ribs 63 which are of truncated gothic arch shape in the illustrated section, to provide for angular contact in the same manner above described with reference to FIG. 3 of the drawings. In this embodiment, the result once again is that when the joint is transmitting torque there is a high resistance to tilting misalignment of the roller in the guide groove, and when torque is not being transmitted the roller cannot tilt to any substantial extent in the groove.

In all the embodiments above described, a needle roller bearing assembly is interposed between the internal cylindrical surface of each inner roller and the cylindrical surface of the respective arm. It would be within the scope of the invention if a plain bearing were provided at this point, for example in the form of a bearing bush of a suitable material such as a plastics or sintered metallic bearing material. Such a bush may be slidable and rotatable relative to the inner roller element, the arm, or both these components. Yet a further possibility is that the inner roller element 28 itself may be made of such a bearing material so that it engages directly and is able to rotate about and slide lengthwise of the arm 13 with sufficient freedom and without any interposed bearing member or assembly (FIG. 4). It may be possible to form an inner roller element of a suitable plastics material by moulding it directly in situ into the roller, thereby avoiding the necessity for having to provide the roller and inner roller element with relieved portions to facilitate assembly thereof (in the manner described with reference to FIG. 5 of the drawings) or for having to spring the roller and inner roller element together. Such a plastics inner roller element could be reinforced by a metal insert.

Although the invention has been described above in relation to a tripod joint of the kind specified wherein each roller is carried by its arm with the intermediary of an inner roller element, the roller and inner roller element having complementary substantially part-spherical surfaces and the inner roller element being able to rotate about and move lengthwise of the arm, it will be appreciated that the invention in its broadest aspect is also applicable to other types of tripod joint of the kind specified. Thus, the advantages of improved control of alignment of the rollers of the joint in their guide grooves are obtained if the configuration of the engaging parts of roller and guide groove is applied, for example, to a joint of the kind disclosed in GB 2 018 393 referred to hereinbefore. There are other types of tripod joint wherein the rollers are able to rotate about, move lengthwise of, and tilt relative to the arms by which they are carried, and the invention can advantageously be applied to such other types of joint.

Referring finally now to FIG. 13 of the drawing, the two parts of this figure illustrate how, if there is not provided any means positively for preventing the rollers of the joint from tilting in the guide grooves, the ability of the rollers to tilt slightly as a result of production clearances between rollers and grooves can give the joint the ability to articulate to a slightly greater extent than would normally be the case.

Figure 13B:
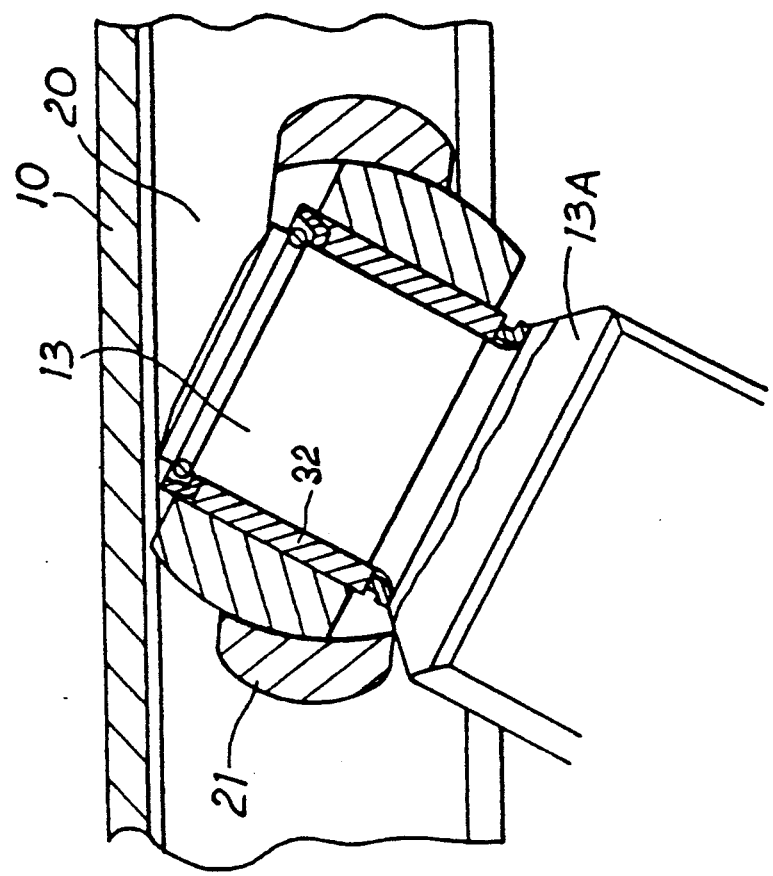
FIGS. 13A and 13B show how increased joint articulation is obtainable if the rollers are allowed to tilt slightly in their guide grooves.
Figure 13A:
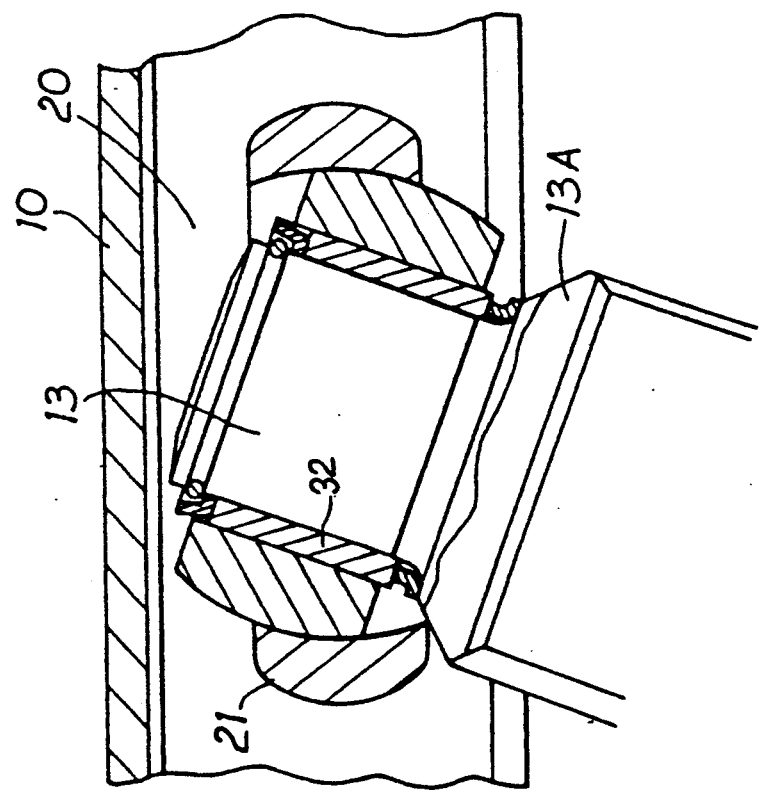
Figure 14:
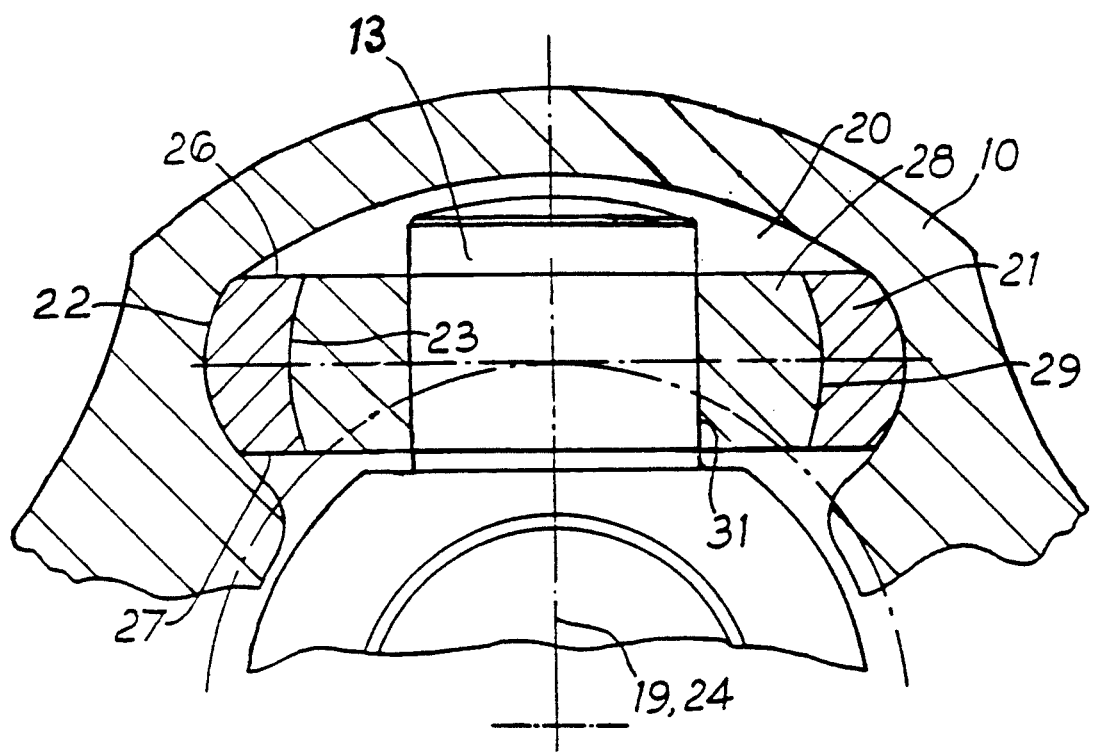
FIG. 14 is similar to FIG. 2 but with various details eliminated so as to show more clearly that no needle bearings are present.

FIGS. 13A and 13B are not sections as FIG. 1 wherein the axes of rotation of both the inner and outer joint members lie in the plane of the drawing. In these figures, the axis of the outer joint member lies in the drawing plane while the axis of the inner joint member is inclined to such plane at the angle which best illustrates the condition wherein the roller has its minimum clearance from the inner joint member.

FIG. 13A shows roller 21 in alignment in guide groove 20, when the joint is articulated to its normal maximum angle wherein the roller has contacted a root portion 13A of arm 13. In FIG. 13B, the roller has tilted to the maximum extent possible in its groove, enabling the joint to articulate by an extra angle equal to the angle by which the roller has tilted.

As is referred to above, since in use of a motor vehicle the conditions requiring maximum joint articulation are transient, it is not detrimental if such tilting during maximum articulation produces an increased resistance to joint rotation and plunge.

What is claimed is:

1. A constant velocity ratio universal joint of the tripod type comprising an outer joint member (10) having a rotational axis (17) and three guide grooves (20) extending parallel to its rotational axis and equally circumferentially spaced thereabout, each guide groove having opposed side portions; and inner joint member (12) disposed inside the outer member (10), having a rotational axis (18) and three arms (13) equally spaced about this rotational axis extending radially into the guide grooves (20) of the outer joint member; each arm carrying a roller (21) having an external surface (22) which engages said opposed side portions of the guide groove (20) into which the arm extends so that the roller is constrained to roll therealong; each roller being able to rotate about, move lengthwise of, and tilt relative to the arm (13) by which it is carried; wherein the cross-sectional shape of said external surface of each roller is of a truncated gothic arch shape, and the cross-sectional shape of each guide groove side portion is of a gothic arch shape different from said truncated gothic arch shape of the roller external surface, said roller external surface and each guide groove side portion having angular contact engagement with one another at two spaced points which lie in said roller external surface and guide groove side portion which are parts of said gothic arch shapes.

2. A joint according to claim 1 further characterised in that each roller (21) is carried on an arm by an inner roller element (28) said inner roller element having a substantially part-spherical external surface (29) and said roller having a complementary substantially part-spherical surface (23) in its interior engaged by said internal surface of the inner roller element, the inner roller element (28) further comprising a cylindrical internal surface (30) whereby it is able to rotate about and move lengthwise of the arm.

3. A joint according to claim 2 further characterised in that a needle roller bearing assembly (32, 33) is interposed between the internal cylindrical surface of each inner roller and a cylindrical surface (31) of each arm.

4. A joint according to claim 2 further characterised in that said roller (21) and inner roller element (28) have relieved portions (42,43,44) enabling the roller and inner roller element to be assembled and their substantially part-spherical surfaces engaged with one another while they are oriented with their axes at right angles to one another.

5. A joint according to claim 2 further characterised in that said roller (21) and inner roller element (28) are assembled and their substantially part-spherical surfaces engaged with one another by resilient deformation of at least one thereof whilst their axes are disposed generally perpendicular to one another.

6. A joint according to claim 2 further characterised in that said inner roller element comprises a bearing material and said internal cylindrical surface thereof engages directly with a cylindrical surface of the arm.

7. A joint according to claim 2 further characterised in that said substantially part-spherical external surface of the inner roller element and said substantially part-spherical interior surface of the roller have a lower coefficient of friction therebetween than the coefficient of friction between the external surface of the roller and the guide groove side portions.

8. A joint according to claim 1 further characterised in that each roller-engaging side portion of each guide groove comprises at least one shoulder (50,50A, 51) and each roller has an end face (26) engageable with a respective shoulder to prevent the roller from tilting substantially in the groove when torque is not being transmitted.

9. A joint according to claim 8 further characterised in that the or each said shoulder (51) is inclined so as to have line contact with the roller end face when the roller begins to tilt.

10. A joint according to claim 1 further characterised in that each roller has a part (52) extending radially outwardly of the joint as a whole beyond the outermost end of the arm by which the roller is carried, and each guide groove has an abutment surface (54) engageable with an end face (55) of the roller part (52) to constrain the roller from tilting in the guide groove when torque is not being transmitted.

11. A joint according to claim 1 further characterised by a respective guide element (70-73) engaging diametrically opposed parts of each roller and also engaging a base portion of the respective guide groove for sliding movement therealong, to constrain the roller from tilting in the guide groove when torque is not being transmitted.

12. A joint according to claim 1 further characterised in that the external surface (62) of each roller (60) is concave as viewed in section, and the side portions of each guide groove comprise opposed projecting ribs (63).

13. A joint according to claim 1 further characterised in that the roller external surface is asymmetrical about a central plane (37C) of the roller perpendicular to its axis.

* * * * *